United States Patent [19]
Gundlach

[11] Patent Number: 5,264,739
[45] Date of Patent: Nov. 23, 1993

[54] TWO-HANDED CONTROLLER FOR PREVENTING TRIGGER TIE-DOWN

[75] Inventor: Joseph C. Gundlach, 142 Orchard La., Oak Ridge, Tenn. 37830

[73] Assignee: Acraloc Corporation, Oak Ridge, Tenn.

[21] Appl. No.: 777,068

[22] Filed: Oct. 16, 1991

[51] Int. Cl.$^5$ .......................... B26D 5/00; H01H 36/00
[52] U.S. Cl. ...................... 307/328; 307/113; 307/326
[58] Field of Search .......... 307/326, 328, 113; 361/189, 190; 192/131 R, 129 A, 130, 131 H; 328/7

[56] References Cited
U.S. PATENT DOCUMENTS 3,721,833  3/1973  Kramer ................ 307/517

Primary Examiner—A. D. Pellinen
Assistant Examiner—Aditya Krishnan
Attorney, Agent, or Firm—Pitts & Brittian

[57] ABSTRACT

A two-hand controller for preventing trigger tie-down (10) for preventing the tie-down of an activation control switch (36,38) on equipment provided with two activation control switches (36,38). The two-hand controller for preventing trigger tie-down (10) includes a power supply (20) for supplying low voltage power to the two-hand controller (10). A comparator (18) is provided for comparing a signal (166) associated with the operation of the activation controls. An optocoupler (164) is included for receiving an optical signal (168) and activating a pilot relay (118). A constant current circuit (24) is provided for regulating the magnitude of current. A logic circuit (16) is provided for processing the signals (74,76) delivered by the activation controls (36,38) for determining when the activation controls (36,38) have been activated within a selected period of time. An inverter (46) is provided to process the output of the logic circuit (16). A diode array (26) is provided for insuring a positive voltage supply to a voltage regulator (28).

17 Claims, 4 Drawing Sheets

TWO-HANDED CONTROLLER FOR PREVENTING TRIGGER TIE-DOWN

TECHNICAL FIELD

This invention relates to the field of equipment provided with dual activation controls for the safety of the user. More specifically, this invention relates to a device for preventing the tie-down of one of the activation controls of such equipment, thus preventing the user from bypassing the safety feature.

BACKGROUND ART

In the field of meat cutting, it is well known that equipment such as butchering saws are provided with dual activation controls. Dual activation controls typically consists of a pair of triggers to be operated by the user by depressing one each with each hand. The dual activation controls are provided so that when the saw is operated, the user's hands are secured to the saw and thus cannot be in danger from contacting the moving blade.

It is also well known that such safety devices are employed on many other types of equipment whose operation creates an inherent danger to the operator's body. Common to this type of equipment are punch presses or other types of equipment wherein the operator is required to position a workpiece with his/her hands and then activate the equipment, thus endangering the operator's hands when in the area of the workpiece.

Further, it is well known that operators of such equipment are prone to tie down one of the activation controls such that only one hand is required to operate the equipment. However, when such tie-down is accomplished, the operator has bypassed the safety feature and once again places his/her body in danger.

Therefore, it is an object of this invention to provide a means for preventing the tie-down of the activation controls of equipment provided with dual activation controls, thus insuring the use of both of the operators hands when operating the subject equipment.

It is also an object of the present invention to provide such a device which is of such size to allow the retro-fitting of existing equipment by placing the device within the existing trigger cavities of the equipment.

It is a further object of the present invention to provide a device which will allow the retrofitting of existing equipment by placing the device within existing cavities with previously configured wiring connections.

Another object of the present invention is to provide a device for preventing the tie-down of the activation controls wherein the device is configured in such a way as to prevent installation which would allow single-switch operation of the equipment.

Still another object of the present invention is to provide such a device for preventing the tie-down of one of the activation switches wherein the wiring of the switches may not be altered in order to obtain one-switch operation capability.

Yet another object of the present invention is to provide such a device wherein diagnostic capability is provided for assurance of proper operation as well as for determining failure points within the activation system of the equipment.

DISCLOSURE OF THE INVENTION

Other objects and advantages will be accomplished by the present invention which serves to prevent the tie down of an activation control switch on equipment provided with two activation control switches. The two-hand controller for preventing trigger tie-down of the present invention includes a power means for supplying a low voltage to the two-hand controller. In the preferred embodiment, a voltage with a magnitude of 12 to 18 volts associated with alternating current is supplied. The power means is preferably a transformer having a standard configuration. The alternating current is rectified and filtered to obtain a nominal operating voltage and also a constant current with a selected magnitude.

A comparator is provided for comparing the filtered voltage with the voltage associated with the operation of the activation controls of the subject equipment. In the preferred embodiment, the comparator means is a dual comparator having first and second comparators.

The reference voltages supplied to the comparators are established by a series of resistors. The series of resistors establishes selected voltages at each of the comparators, the voltages at each comparator being of unequal magnitudes one from the other. Thus, a window is defined by the voltages supplied at the two comparators. In the preferred embodiment, current will flow from the comparator means when an input voltage lies within the window defined at the two comparators.

A signal isolating means is provided for receiving the output signal from the comparator means and isolating the signal input from the output. In the preferred embodiment, an optocoupler is included for receiving an optical signal and activating a pilot relay. In this embodiment, a triode AC semiconductor switch (triac) is used. The triac acts as a switch and is in series with the pilot relay. The above circuitry may be remote from the device switches.

Moreover, a constant current circuit is provided for regulating the magnitude of current.

Switches are provided for activating the power source of a subject device. The switches are as typically provided in the device.

The device includes a feature which prevents the switch from being overridden.

A logic circuit is provided for processing the signals delivered by the first and second switches. In the preferred embodiment, the logic circuit includes a plurality of NOR gates connected in series. The logic circuit serves to determine when the activation controls have been activated within a selected period of time. When this occurs, a signal is output with a selected magnitude and is delivered to the comparator means. The output signal is of a magnitude which is within the window defined at the comparators.

An inverter means is provided to process the output of the logic circuit. The inverter means delivers the inverted signal to a Zener diode for regulating the voltage transmitted from the constant current supply through a diode array and delivered to a voltage regulator. The diode array is provided for insuring a positive voltage regardless of the connection of the connecting wires. The voltage supplied to the voltage regulator is used to supply the circuitry of the logic module circuit of the two-hand controller.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A two-hand controller for preventing trigger tie-down incorporating various features of the present invention is illustrated generally at 10 in the figures. The two-hand controller for preventing trigger tie-down 10 is designed for use with equipment provided with dual activation switches 36, 38, each of which must be activated in order to power the subject equipment. The purpose of the two-hand controller 10 is to provide a means whereby the activation switches 36, 38 must be actuated within a selected period of time of each other. Thus, if an equipment operator attempts to permanently bias one of the switches 36, 38 in an activation position while releasing the other, the two-hand controller 10 will prevent operation of the equipment. Moreover, in the preferred embodiment the two-hand controller for preventing trigger tie-down 10 is designed such that improper installation will not yield the capability of single switch operation.

Figure 1:
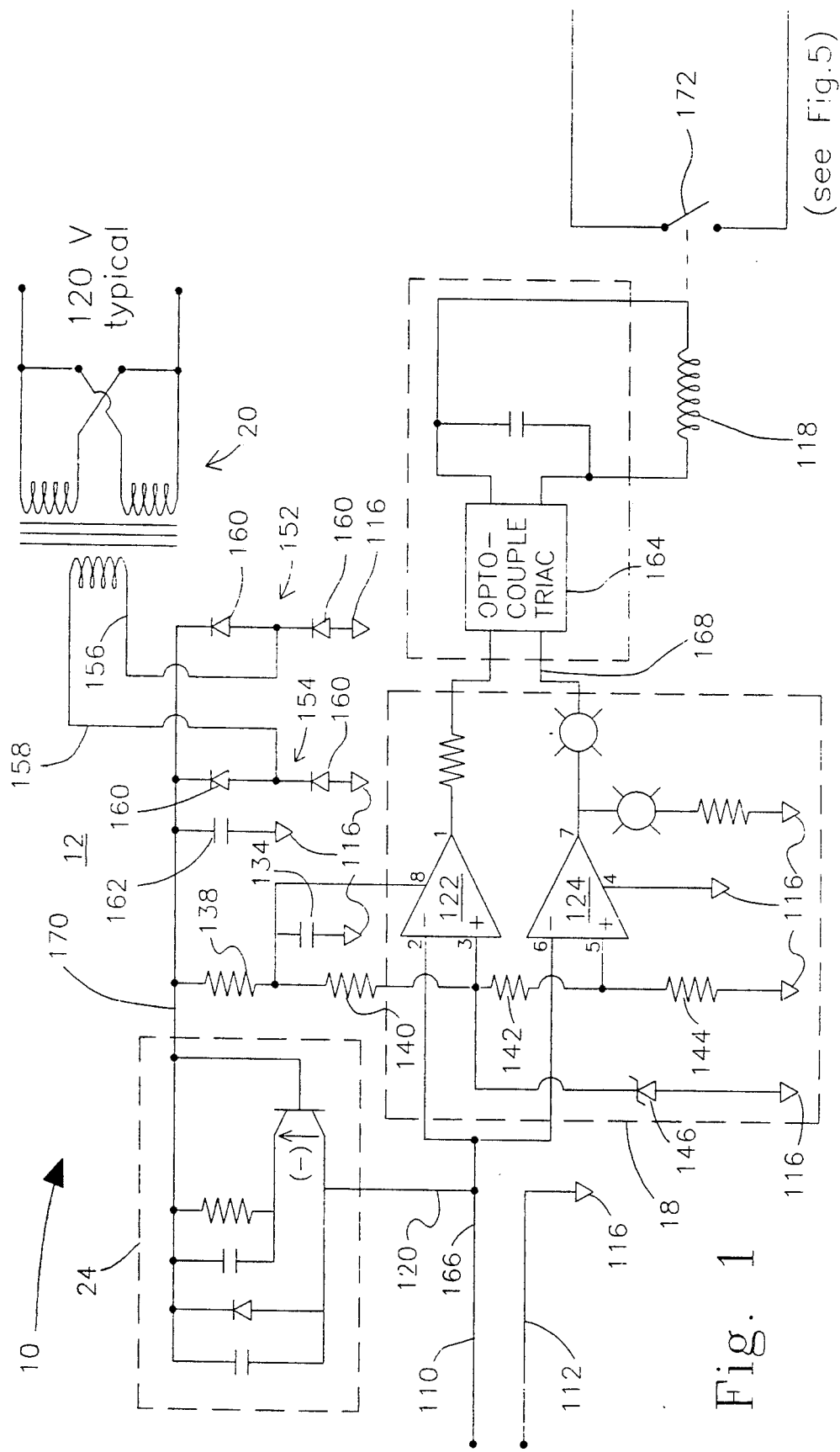
FIG. 1 is a circuit diagram representation of Module A of the present invention.

Referring generally to FIG. 1 which illustrates the portion of the invention known as Module A 12, a power means 20 is provided for supplying a low voltage to the two-hand controller 10. In the preferred embodiment, a voltage with a magnitude of 12 to 18 volts is supplied. The power means 20 is preferably a transformer having a standard configuration. In this embodiment, the voltage is associated with alternating current. First and second wires 156, 158 are connected to the power means 20 for supplying power to the two-hand controller 10.

In the preferred embodiment, the power supplied is associated with alternating current. The AC voltage is rectified and filtered to obtain a voltage at supply wire 170 and a constant current with a selected magnitude at source line 120. In embodiment, a plurality of rectifiers 160, commonly called a full wave bridge rectifier, is provided. A first pair 152 of rectifiers 160 is connected in series, one terminal of the pair 152 being connected to the common ground 116, and the remaining terminal being connected to the power supply line 170. A second pair 154 of rectifiers 160 is connected in similar fashion as the first pair 152 The ends of the first and second wires 156, 158 leading from the power means 20 are connected to the junctions of the individual rectifiers in each of the first and second pairs of rectifiers 152, 154, respectively.

The filtering is accomplished through the use of a capacitor 162 connected at one terminal to the supply wire 170 and at the opposing terminal to the common ground 116.

A comparator means 18 is provided for comparing the filtered voltage with the voltage associated with the operation of the activation controls 36, 38 of the subject equipment. The latter mentioned voltage will be described in greater detail along with the description of FIG. 2, which is an illustration of the portion of the invention referred to as Module B 14. In the preferred embodiment, the comparator means 18 is a dual comparator having first and second comparators 122, 124. As shown in FIG. 1, the first comparator 122 defines pins 1, 2, 3 and 8, and the second comparator 124 defines pins 4, 5, 6 and 7, pins 4 and 8 being common to both.

The voltages supplied to the comparators 122, 124 are established by a series of resistors 138, 140, 142, 144 and a Zener 146. The series combination of resistors 138, 140 supplies voltage to the comparators 122, 124 at pin 8. This voltage is filtered by a capacitor 134. The junction of resistors 140, 142 is also joined to one contact of a Zener diode 146. The Zener diode 146 serves to establish a selected voltage magnitude at pin 3 of the first comparator 122. The junction of resistors 142, 144 establishes the voltage magnitude at pin 5 of the second comparator 124. The resister 144 is further connected to the common ground 116.

Output is provided at pins 1 and 7 of the first and second comparators 122, 124, respectively. Output 166 is provided from Module B 14 (see FIG. 2) as input at pins 2 and 6, the input then being compared to the voltage input at pins 3 and 5. The voltage input at pins 2 and 6 will be substantially equal in the preferred embodiment as can be seen from the illustration. Pin 2 is compared to pin 3, and pin 6 is compared to pin 5.

In the illustrated embodiment, the voltage at pin 5 is calculated by voltage division as follows:

$$V_5 = (R4/(R4+R3))*V_3$$

The output at pin 1 is defined as being high when the input at pin 3 is greater than the input at pin 2. Likewise, the output at pin 7 is defined as being high when the input at pin 5 is greater than that at pin 6. In the alternative, pins 1 and 7 are defined to be low if pins 3 and 5 have lower input voltages than pins 2 and 6, respectively. In the preferred embodiment, current will flow from the comparator means 18 when pin 1 is high and pin 7 is low.

When the input voltage at pins 2 and 6 is greater than the voltage at pin 3, the output voltage at pins 1 and 7 will be zero. If the input voltage at pins 2 and 6 is lower than the input voltage at pin 5, both pins 1 and 7 will be high. In each of these two instances, current will not flow from the comparator means 18. Thus it will be seen that in the preferred embodiment, the magnitude of the voltage supplied from Module B 14 must be within the range defined by the magnitude of voltages at pins 3 and 5.

A signal isolating means 164 is provided for receiving the output signal 168 from the comparator means 18 and isolating the signal input from the output. In the preferred embodiment, an optocoupler is included for receiving an optical signal and activating a pilot relay 118. In this embodiment, a triode AC semiconductor switch (triac) is used. The pilot relay switch 118 may be incorporated within the two-hand controller 10 as shown in phantom in FIG. 1 or, as in the instance of butchering saws, the pilot relay switch 118 is incorporated within the device.

Figure 5:
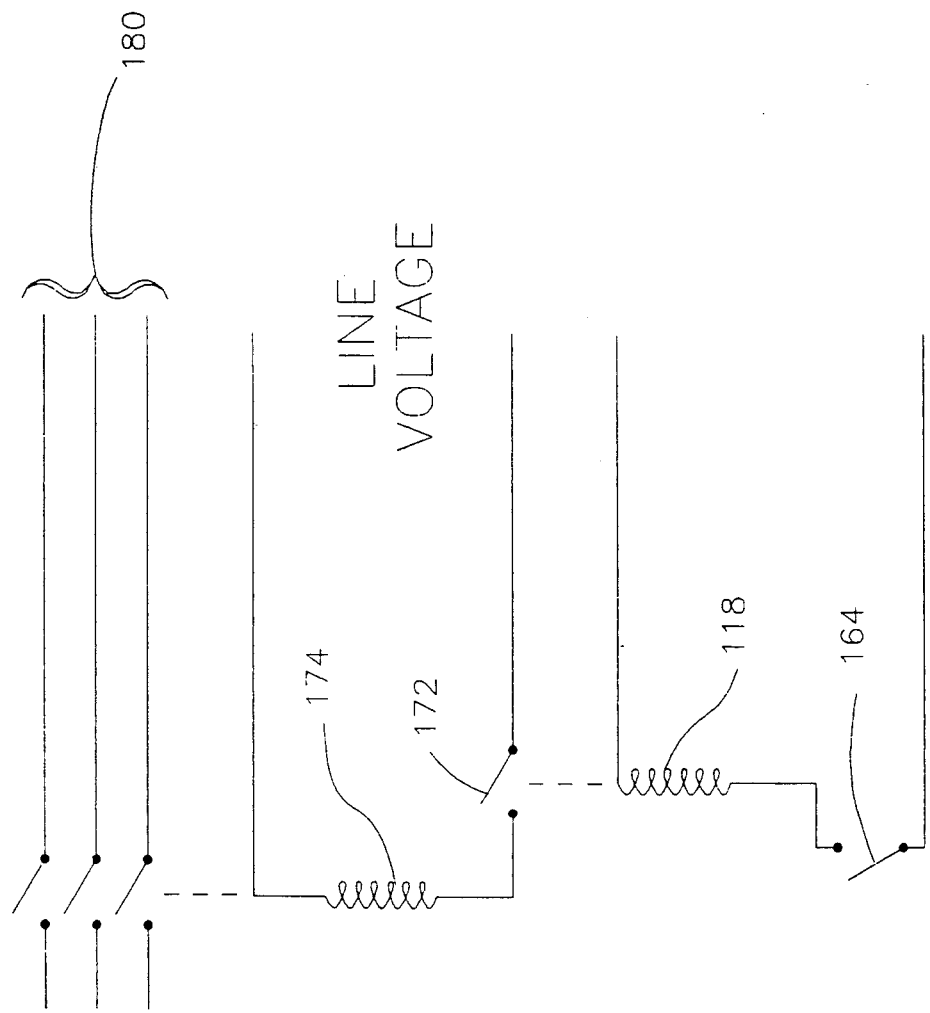
FIG. 5 is a schematic diagram of the signal isolator means shown in FIG. 1 of the present invention.

The triac 164 acts as a switch 172 and is in series with the pilot relay 118. When the switch 172 is closed, the pilot relay 118 is activated and in turn engages a contactor 174 (see FIG. 5). The contactor 174 then operates a three-phase voltage 180 which supplies power to the device.

A constant current circuit 24 is provided for regulating the magnitude of current in the line from Module B 14 to the input at pins 2 and 6 of the comparator means 18. In the preferred embodiment, a current of less than 40 milliamperes will be attained when neither switch is operated. When the desired logic is operated, i.e. both switches 36, 38 are operated within the selected time period, the voltage is established by the Zener 90 and the LED 88 in series, and the current will be limited by the constant current supply to approximately 40 milliamperes. The voltage will be less than that at pin 3 and greater than that at pin 5. In the event the source line 120 is shorted to ground, the constant current will still be attained but the voltage will be less than that on pin 3 and pin 5 of Module A 12.

Figure 2:
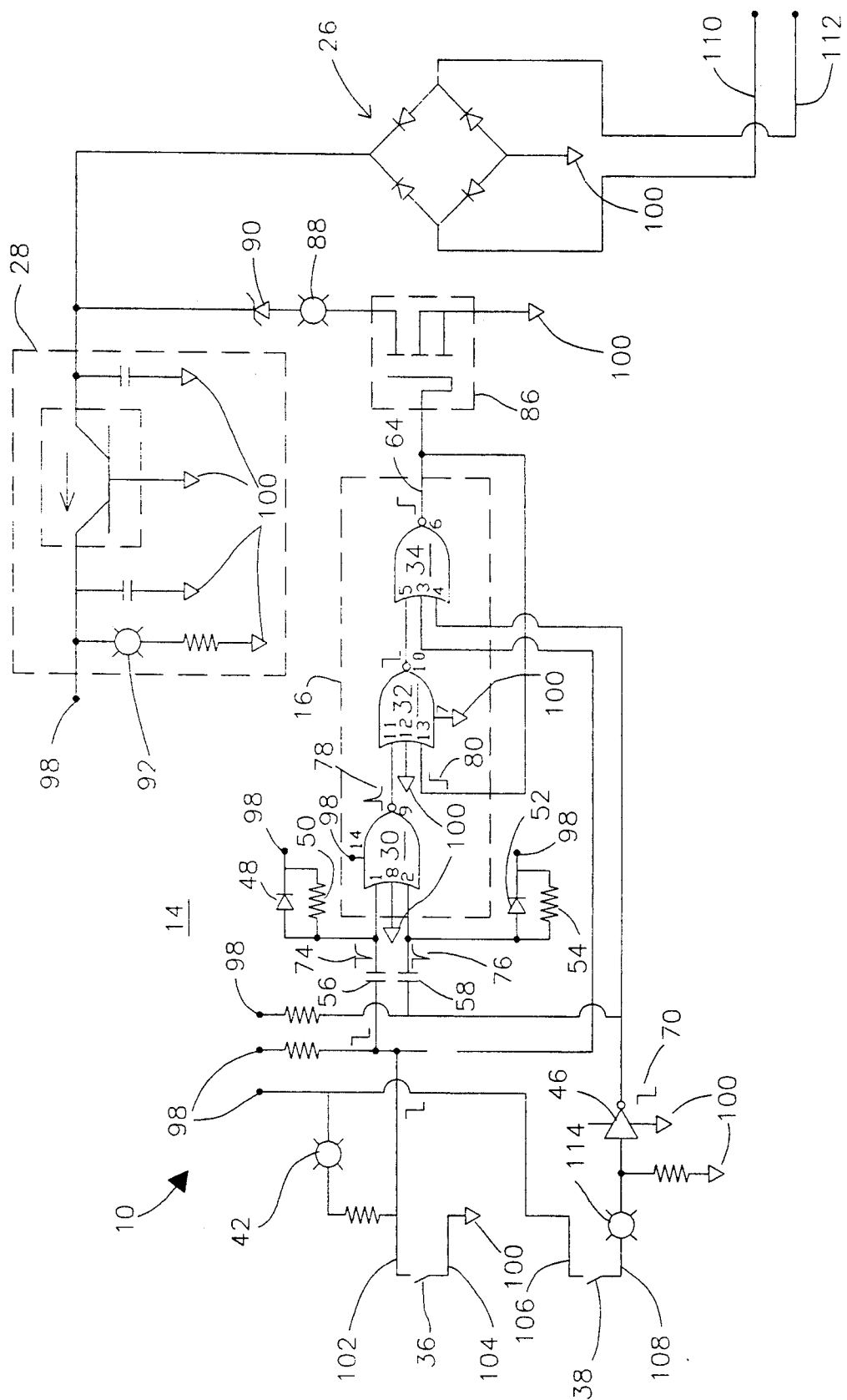
FIG. 2 is a circuit diagram representation of Module B of the present invention.

Referring to FIG. 2, which is a schematic diagram of Module B 14 of the present invention, switches 36, 38 are provided for activating the power source (not shown) of a subject device. The switches 36, 38 are as typically provided in the device. A first switch 36 is electrically connected to wires 102, 104 of Module B 14, and a second switch 38 is connected to wires 106, 108. The wire 104 connected to the first switch 36 is further connected to the common 100.

When the first switch 36 is activated, the light emitting diode (LED) 42 is supplied with current and is therefore activated to signal the activation of the first switch 36. When the second switch 38 is closed, an LED 114 is activated to indicate the activation of the second switch 38.

A first inverter means 46 is provided such that as the voltage supplied due to the closing of the second switch 38 goes high, the output is inverted to be low, as illustrated graphically at 70. Thus, as the input at pin 1 of the inverter means 46 goes high, the output at pin 3 of the inverter means 46 will go low. The inverter means 46 further serves to prevent the ability to override the two-hand controller 10 by preventing operation if both inputs 110 and 112 are directly connected to the first switch 36 for the purposes of operating with one hand.

A logic circuit 16 is provided for processing the signals delivered by the first and second switches 36, 38. In the preferred embodiment, the logic circuit includes a plurality of NOR gates connected in sequence. Each NOR gate includes at least four pins. Shown in FIG. 2 is a triple NOR gate circuit defining pins 1 through 14. A first NOR gate 30 defines pins 1, 2, 8, 9 and 14, with pin 14 being common to all three NOR gates 30, 32, 34. Pin 8 is a ground. Pins 1 and 2 are pins for inputting the high pass filtered, or derivative, signals—shown graphically at 74, 76—associated with the first and second switches 36, 38, respectively. Pin 14 is for the input of voltage from a voltage regulator 28. Pin 9 is connected to the second NOR gate 32 at pin 11.

The second NOR gate 32 defines pins 7, 10, 11, 12 and 13, where pin 7 is common to all three NOR gates 30, 32, 34. Pins 7 and 12 are grounds. Pins 1 and 13 are initially set low as depicted graphically at 78, 80, with pin 11 being reproduced at pin 10. Thus pin 10 is initially low. Pin 13 receives input from pin 6 of the third NOR gate 34. Pin 10 outputs a signal to pin 5 of the third NOR gate 34.

A third NOR gate 34 defines pins 3, 4, 5 and 6. Pin 3 receives an input voltage associated with the closing of the first switch 36, and pin 4 receives an input voltage associated with the closing of the second switch 38. Pins 3 and 4 are initially at a high level. When the first and second switches 36, 38 are closed, the signal at pins 3 and 4 will go low, respectively. When the voltage at each of pins 3, 4 and 5 is low, the output at pin 6 will be high. In order for the voltages at the comparator 18 in Module A 12 to be at a level at which power will be supplied to the subject device, the output at pin 6 of the logic circuit 16 must be high.

As described above, pin 13 of the second NOR gate 32 receives output from pin 6 of the third NOR gate 34. Thus, when pin 6 is high, pin 13 is correspondingly high. Due to the characteristics of a NOR gate, if any of the input pins have a high voltage, the output will be low. Thus when the output at pin 6 is high, the output at pin 10 will be low due to the voltage level at pin 13. In this situation, it will not matter what happens at pins 11 and 12 until at least one of the switches 36, 38 are opened, causing the respective pins 3 and 4 to go high.

In order for pin 6 of the third NOR gate 34 to obtain a high voltage output, the inputs at pins 3, 4 and 5 must be low. As previously described, pins 3 and 4 will go low when the corresponding switches 36, 38 are closed. Pin 5 will go low when pin 10 of the second NOR gate 32 goes low, which as described above occurs when either of pins 11 or 13 go high. Pin 13 is initially low, but once pin 6 goes high, pin 13 will likewise go high. Pin 13 will remain high as long as pin 6 is high, which will occur only as long as both switches 36, 38 remain closed.

In order for pin 11 of the second NOR gate 32 to go high, all of pins 1, 2 and 8 of the first NOR gate 30 must be low, thereby causing pin 9 to have a high voltage output. Pin 8 remains low due to its grounding. Pins 1 and 2 will achieve a low voltage as the first and second switches 36, 38 are respectively closed. The signal received from each of the switches 36, 38 is filtered through respective capacitors 56 and 58 and the parallel combination of respective diodes 48 and 52 and respective resistors 50 and 54. The effect of the parallel combination of diodes 48, 52 and resistors 50, 54 is to drain the charge stored by the capacitors 56, 58. Thus, the respective pin voltages at pins 1 and 2 will be high for a period of time determined by the parameters of the resistors 50, 54 and capacitors 56, 58. The time constant is determined by the equation $1/RC$, where $R$ = the total resistance and $C$ = the total capacitance.

Therefore, after the respective switches 36, 38 have been closed for the determined length of time, the voltages at pins 1 and 2 will return to a high level, and the output at pin 9 will return to the low level. In order for the output at pin 9 to go high, then, the first and second switches 36, 38 must both be closed within the time defined by the resistor/capacitor combination such that the voltage inputs at pins 1 and 2 will be sufficiently low to produce a high output at pin 9. In the preferred embodiment, the time allowable is approximately one second.

If during operation of the subject device, one of the switches 36, 38 is opened, the input at the respective pins 3 and 4 of the third NOR gate 34 will go high, thus necessitating the opening of both switches 36, 38 in order to make possible the restarting of the equipment.

A second inverter means 86 is provided to process the output of the logic circuit 16. The second inverter means 86 delivers the inverted signal 64 through the light emitting diode (LED) 88 to a Zener diode 90 for regulating the voltage from the constant current supply 24 in Module A 12, through diode array 26, and delivered to a voltage regulator 28. The second inverter means 86 further serves to prevent the connection of either switch 36, 38 directly to the line voltage in an attempt to override the operation of the two-hand controller 10.

The voltage supplied to the diode array 26 is delivered back to Module A 12 along the connecting wires 110, 112. The diode array 26 is provided for insuring a positive voltage regardless of the connection of the connecting wires of Module A 12 to the connecting wires of Module B 14.

The voltage supplied to the voltage regulator 28 is used to supply the circuitry of Module B 14. In the preferred embodiment, an LED 92 is provided for diagnostic purposes. The LED 92 indicates that the selected voltage is present at the output of the voltage regulator 28. The output of the voltage regulator 28 is delivered to Module B 14 at inputs indicated at 98. The inputs 98 of the preferred embodiment are conventional power supply points.

Figure 3:
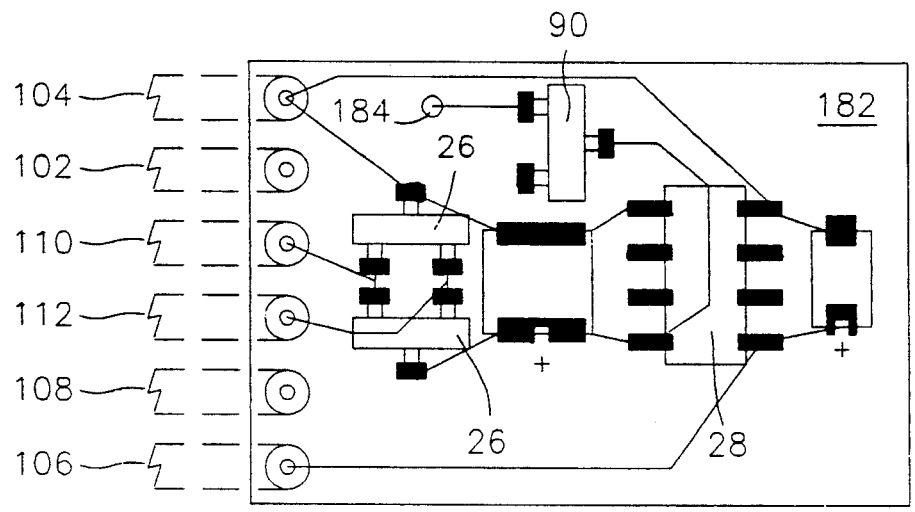
FIG. 3 is a top plan view of Module B illustrated schematically in FIG. 2 of the present invention.
Figure 4:
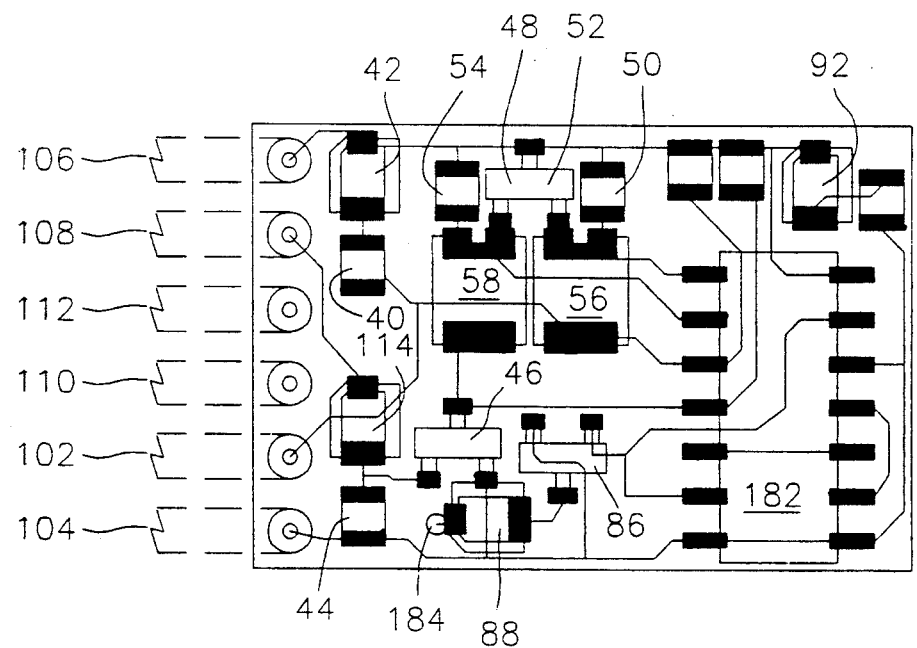
FIG. 4 is a bottom plan view of Module B illustrated schematically in FIG. 2 of the present invention.

Referring now to FIGS. 3 and 4, which are top and bottom plan views of Module B 14, the preferred embodiment of the circuitry board 182 is illustrated. A through opening 184 is defined by the board member 182 for the passage of electrical connection between the light emitting diode 88 and the Zener diode 90 which serve to limit the minimum voltage supplied to the voltage regulator 28.

From the foregoing description, it will be recognized by those skilled in the art that a two-hand controller for preventing trigger tie-down offering advantages over the prior art has been provided. Specifically, the two-hand controller for preventing trigger tie-down provides a means for insuring that both hands of an operator are used to power the subject device, thereby preventing injury to the operator. The two-hand controller includes a logic circuit for detecting the activation of the pair of switches incorporated in the subject device. The logic circuit is further designed to output a signal when the activation of the switches is performed within a selected period of time. If the activation of the switches occurs within a time greater than the selected time, the equipment will not be powered for normal operation. If one of the two switches is opened during operation, the logic circuit serves to discontinue power to the equipment, thereby requiring the release of the remaining switch and the activation of both switches again in order to regain power.

The two-hand controller is further provided with a comparator means for processing the signal delivered from the logic circuit. The voltage level of the signal produced by the logic circuit is compared to two selected voltages input at two comparators. When the voltage level detected from the logic circuit has a magnitude within the range defined by the input voltages at the comparators, the comparator means activates a switch which allows power to be delivered to the equipment for normal operation.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A two-hand controller for preventing trigger tie-down, said two-hand controller for use with a selected electrically-operated device supplied with a plurality of activation controls, wherein said activation controls must each be activated in order for power to be delivered for normal operation of said electrically-operated device, said two-hand controller comprising:
    a switching device for activating a power source for said operation of said electrically-operated device, said switching device including said plurality of activation controls;
    logic circuitry for detecting the activation of said switching device;
    an inverter for preventing improper wiring of said two-hand controller to said electrically-operated device, thereby at least reducing the ability to override said operation of said two-hand controller;
    a comparator for comparing a signal output from said logic circuitry to at least one preselected signal; and
    a power supply for supplying power to said two-hand controller during said operation.

2. The two-hand controller for preventing trigger tie-down of claim 1 further comprising a voltage regulator for regulating voltage delivered to said two-hand controller.

3. The two-hand controller for preventing trigger tie-down of claim 1 wherein said inverter is connected between said switching device and said logic circuitry such that said switching device may be connected in any manner without losing operability of said two-hand controller.

4. The two-hand controller for preventing trigger tie-down of claim 1 wherein said logic circuitry outputs a signal with a selected magnitude if and only if each of said plurality of activation controls is activated within a selected period of time.

5. The two-hand controller for preventing trigger tie-down of claim 4 wherein said output signal is a continuous signal, said output signal being interrupted only upon deactivation of at least one of said plurality of activation controls.

6. The two-hand controller for preventing trigger tie-down of claim 1 wherein said comparator compares at least first and second signals to said output signal from said logic circuitry, said first signal defining a first selected magnitude and said second signal defining a second selected magnitude, said first and second selected magnitudes defining a magnitude range within which said logic circuitry output signal must occur in order for said normal operation of said electrically-operated device.

7. The two-hand controller for preventing trigger tie-down of claim 1 dimensioned to be received within said electrically-operated device proximate said switching device.

8. A two-hand controller for preventing trigger tie-down, said two-hand controller for use with a selected electrically-operated device supplied with a plurality of activation controls, wherein said activation controls must each be activated in order for power to be delivered for normal operation of said electrically-operated device, said two-hand controller comprising:
    a switching device for activating a power source for said operation of said electrically-operated device, said switching device including said plurality of activation controls;

logic circuitry for detecting the activation of said switching device, said logic circuitry outputting a signal with a selected magnitude if and only if each of said plurality of activation controls is activated within a selected period of time, said output signal being a continuous signal, and being interrupted only upon deactivation of at least one of said plurality of activation controls;

an inverter for preventing improper wiring of said two-hand controller to said electrically-operated device, thereby at least reducing the ability to override said operation of said two-hand controller, said inverter being connected between said switching device and said logic circuitry such that said switching device may be connected in any manner without losing operability of said two-hand controller;

a comparator for comparing a signal output from said logic circuitry to at least one preselected signal, said comparator comparing at least first and second signals to said output signal from said logic circuitry, said first signal defining a second selected magnitude, said first and second selected magnitudes defining a magnitude range within which said logic circuitry output signal must occur in order for normal operation of said electrically-operated device; and a power supply for supplying power to said two-hand controller during said operation.

9. The two-hand controller for preventing trigger tie-down of claim 8 further comprising a voltage regulator for regulating voltage delivered to said two-hand controller.

10. The two-hand controller for preventing trigger tie-down of claim 8 dimensioned to be received within said electrically-operated device proximate said switching device.

11. A two-hand controller for preventing trigger tie-down, said two-hand controller for use with a selected electrically-operated device supplied with a plurality of activation controls, wherein sad activation controls must each be activated in order for power to be delivered for normal operation of said electrically-operated device, said two-hand controller comprising:

a switching device for activating a power source for said operation of said electrically-operated device, said switching device including said plurality of activation controls;

logic circuitry for detecting the activation of said switching device;

an inverter for preventing improper wiring of said two-hand controller to sad electrically-operated device, thereby at least reducing the ability to override said operation of said two-hand controller, said inverter being connected between said switching device and said logic circuitry such that said switching device may be connected in any manner without losing operability of said two-hand controller;

a comparator for comparing a signal output from said logic circuitry to at least one preselected signal; and a power supply for supplying power to said two-hand controller during said operation.

12. The two-hand controller for preventing trigger tie-down of claim 11 further comprising a voltage regulator for regulating voltage delivered to said two-hand controller.

13. The two-hand controller for preventing trigger tie-down of claim 11 wherein said logic circuitry outputs a signal with a selected magnitude fi and only if each of said plurality of activation controls is activated within a selected period of time.

14. The two-hand controller for preventing trigger tie-down of claim 13 wherein said output signal is a continuous signal, said output signal being interrupted only upon deactivation of at least one of said plurality of activation controls.

15. The two-hand controller for preventing trigger tie-down of claim 11 wherein said comparator compares at least first and second signals to said output signal from said logic circuitry, said first signal defining a first selected magnitude and said second signal defining a second selected magnitude, said first and second selected magnitudes defining a magnitude range within which said logic circuitry output signal must occur in order for said normal operation of said electrically-operated device.

16. The two-hand controller for preventing trigger tie-down of claim 11 further comprising constant current circuitry for regulating current within said two-hand controller.

17. The two-hand controller for preventing trigger tie-down of claim 11 dimensioned to be received within said electrically-operated device proximate said switching device.

* * * * *